June 19, 1962 V. LICARI 3,039,493
VEHICLE
Filed June 24, 1960 2 Sheets-Sheet 1

FIG. I

INVENTOR:
VINCENT LICARI
BY John F. Schmidt

June 19, 1962     V. LICARI     3,039,493
VEHICLE
Filed June 24, 1960     2 Sheets-Sheet 2

INVENTOR:
VINCENT LICARI
BY John F. Schmidt 3,039,493
VEHICLE
Vincent Licari, Washington, Ill., assignor to LeTourneau-Westinghouse Company, Peoria, Ill., a corporation of Illinois
Filed June 24, 1960, Ser. No. 38,505
7 Claims. (Cl. 137—625.44)

This invention relates to a vehicle having a powered dump body and means for directing the power plant exhaust through the body or alternatively through other exhaust conduit means.

There is a substantial industry in earthmoving in which automotive vehicles are provided with tiltable dump bodies. One of the more widespread uses of such a vehicle is for the transporting of earth, minerals, and the like, from one location to another. The material transported is often shovel-loaded into the vehicle body and the body is tilted about a given axis at the point of discharge in order to dump the material. The material which is transported is often wet with the result that cold weather operations are impeded by freezing of the wet material onto the transporting body, making dumping difficult or impossible. A common expedient to avoid the difficulty is heating of the dump body by means of the exhaust from the internal combustion engine which powers the vehicle. The engine exhaust is commonly introduced into the body at a forward position thereof and the body connection with the engine exhaust piping is broken when the body is tilted for dumping purposes. With the body connection broken, the engine exhaust commonly blows into the atmosphere at a point close to the operator's station, blowing into the cab and constituting a nuisance to the operator.

It is accordingly an object of this invention to provide a vehicle having a powered tiltable dump body which is adapted to be heated by means of engine exhaust, the exhaust piping being provided with a valve and an alternate exhaust conduit such that, when the body is tilted to dump the load, the body becomes disengaged from the exhaust system and the valve redirects the engine exhaust to the alternate exhaust conduit which discharges the offensive engine exhaust into the atmosphere at a point remote from the operator's station, or at least at a point where the discharged exhaust does not constitute a nuisance to the operator. Other advantages will be apparent to those skilled in the art.

Figure 1:
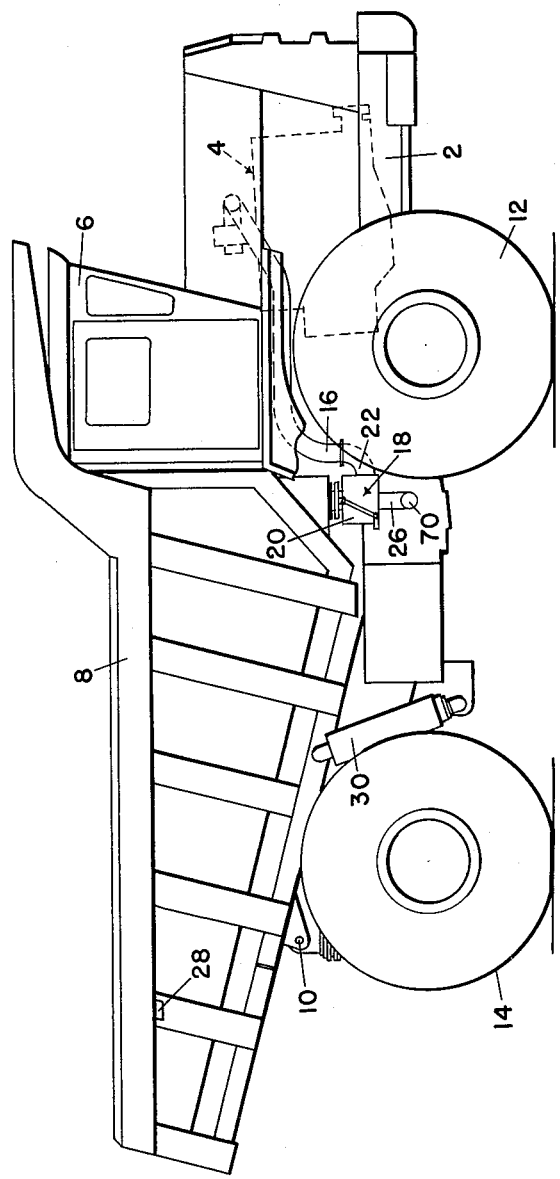
Figure 2:
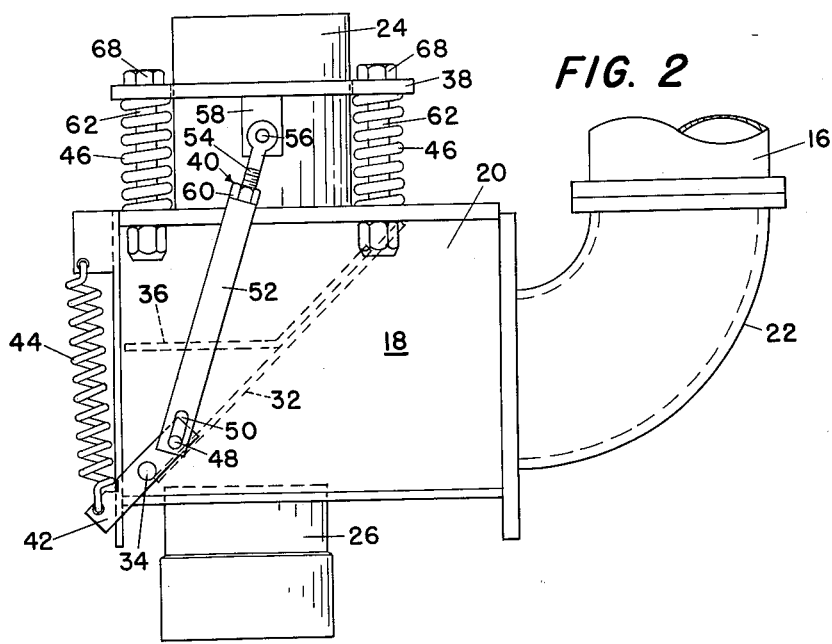

In the drawings:
FIG. 1 is a side elevation view of a dump truck made according to this invention;
FIG. 2 is a side elevation view of a valve made according to the invention and on a much larger scale than FIG. 1; and
FIG. 3 is a view of the valve shown in FIG. 2 in a different operating position, and with parts broken away and in section to illustrate details.

FIG. 1 shows the vehicle as a whole wherein a frame 2 carries a power plant indicated generally at 4, power plant 4 usually being an internal combustion engine; the frame carries an operator's station protected by a cab 6, and a dump body 8 tiltable about a dumping axis 10. Front and rear wheels 12 and 14 respectively are suitably mounted on the frame 2.

The exhaust from the internal combustion engine is carried by an exhaust pipe 16 to a valve indicated generally at 18.

Figure 3:
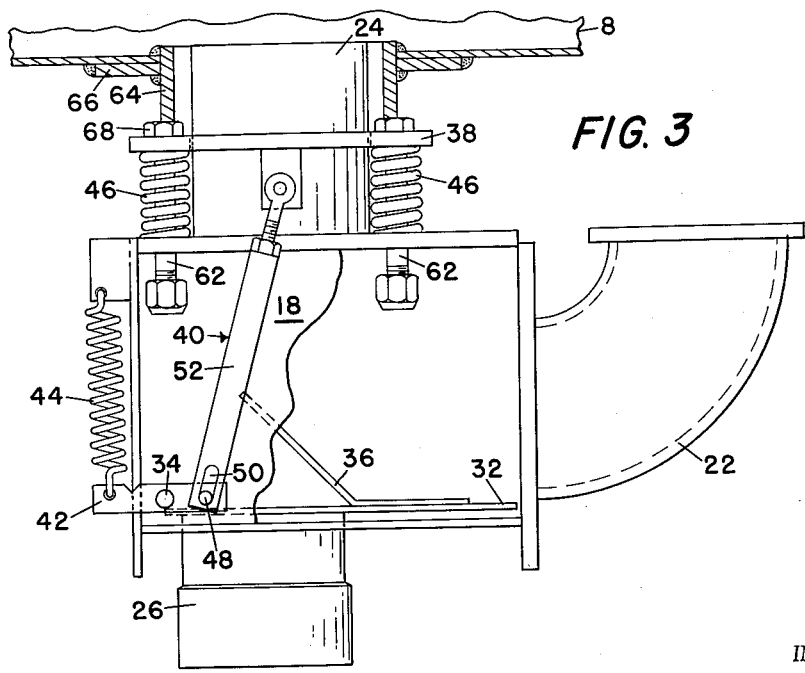

Valve 18 includes a valve body 20 having a valve inlet 22 and, as is better seen in FIGS. 2 and 3, valve outlets 24 and 26. As will be understood by those skilled in the art, the body 8 is provided with suitable fluid ducts to receive the engine exhaust; fluid outlets are usually provided at opposite sides of the body near the rear end thereof, one of these being shown in FIG. 1 at 28. Suitable power means are provided to tilt the body about the axis 10 for dumping, the power means here taking the form of two hydraulic jacks one of which is shown at 30. The jacks are provided with fluid under pressure from a hydraulic system including a pump driven by the power plant 4. Hydraulic systems suitable for this purpose are well understood in the art and need not be detailed here.

Referring now to FIGS. 2 and 3 for a more detailed discussion of the valve, it will be seen that the engine exhaust 16 is coupled in any suitable manner with the inlet 22 of valve 18. A directing element 32 is movably mounted and is adapted to connect inlet 22 with one of the outlets 24 and 26. Toward this end, directing element 32 is mounted to pivot about an axis provided by pin 34. In the position shown in FIG. 3, directing element 32 blocks the opening to outlet 26 and thus connects inlet 22 with outlet 24. In the position shown in FIG. 2, directing element 32 blocks communication with outlet 24 and thus connects inlet 22 with outlet 26. A stop 36 may, if desired, be secured to directing element 32.

Actuating means for directing element 32 are provided. It will be noted that outlet 24 is here shown as a conduit projecting from the body 20. Outlet 24 may thus be a short conduit having any desirable shape. It will be found convenient to make the outlet 24 substantially cylindrical in form. The actuating means for directing element 32 includes a collar 38 closely adjacent outlet 24, lost motion connection 40, operating lever 42, resilient means 44, and other resilient means 46. More specifically, collar 38 is mounted closely adjacent to outlet 24 simply by virtue of the fact that the substantially centered opening of collar 38 allows the collar to slip over the outside of the conduit which forms outlet 24.

Operating lever 42 is secured to pin 34 in order to pivot the pin and directing element 32 about the axis of pin 34. Resilient means 44, here shown as a helical spring, is connected with one end of lever 42 and biases lever 42 clockwise as seen in the drawings into the operating position shown in FIG. 3 wherein directing element 32 shuts off outlet 26. Directing element 32 is movable against the bias of resilient means 44 into the position shown in FIG. 2. To accomplish this movement, lost motion connection 40 is connected with lever 42 at the end opposite to the connection with resilient means 44. More specifically, a pin-and-slot connection between lever 42 and a link forming a part of the lost motion connection are provided. In the embodiment shown, a pin 48 is carried by lever 42 and engages a slot 50 in a link 52. Link 52 carries at its upper end a threaded pivot 54 which is pivotally mounted on a pin 56 on an ear 58 depending from collar 38. A lock nut 60 may be provided to secure the threaded pivot 54 in its properly adjusted relationship to link 52. One or more resilient means 46, referred to above, may be provided to bias the collar 38 upward. In the embodiment shown, resilient means 46 takes the form of a plurality of helical springs mounted in compression between collar 38 and the top of valve body 20 and held in place by guide pins 62.

As is best seen in FIG. 3, the vehicle dump body is provided with a fluid inlet that receives valve outlet 24 in order that engine exhaust may be transmittted from the valve to the body passages for eventual discharge by way of fluid outlets 28. The fluid inlet in the body may be thought of in terms simply of the opening in the body. Means operated by movement of the dump body 8 is provided to engage the actuating means for the directing element 32. More specifically, the means operated by movement of the dump body takes the form of a short conduit 64 fitting within the opening which forms the fluid inlet in the body. Conduit 64 is secured to the body by a suitable mounting plate 66 and is adapted to engage the collar 38; the heads 68 are in fact outside the circle of conduit 64.

*Operation*

Let it be assumed that the parts are in the operating position shown in FIGS. 1 and 3. Since the position of the parts is usually or normally as seen in FIGS. 1 and 3, this position is referred to as the normal position of the parts. It is a well-known fact that the fluid exhaust of an internal combustion engine is an offensive substance to human beings; this exhaust is actually even toxic and, when breathed for extended periods of time, results in death, at least partly because of the carbon monoxide content. Even apart from the toxicity of the engine exhaust, the exhaust is sufficiently offensive to make it desirable that the exhaust be diverted away from the operator as far as possible and as much as possible. In the normal (body-down) position, the fluid inlet of the body is connected with the engine exhaust and the offensive exhaust is discharged into the atmosphere at a point remote from the operator's station. However, in conventional dump trucks, as soon as the body starts its dumping motion, the body becomes disengaged from the engine exhaust piping, and the exhaust gases blow upward close to the operator's cab and into the cab to constitute a substantial nuisance.

In a dump truck made according to this invention, as the body 8 starts its dumping motion, the short conduit 64 (FIG. 3) moves upward and allows the resilient means 46 to move collar 38 upward. The lower end of slot 50 in link 52 is in engagement with the pin 34 with the result that lever 42 is pivoted counterclockwise about pin 34 against the bias of spring 44 and against the weight of element 32, thus accomplishing elastic deformation of resilient means 44. Continued upward movement of the body allows resilient means 46 to expand until directing element 32 substantially blocks communication between valve inlet 22 and valve outlet 24. The parts are then in the position seen in FIG. 2, wherein valve inlet 22 is connected with valve outlet 26. Engine exhaust is thereupon directed downward and sidewise by means of the lower exhaust discharge 70 (FIG. 1).

After the load is dumped, the body is returned to its normal or load-carrying position, whereupon the conduit 64 of the body fluid inlet engages collar 38, effecting elastic deformation of resilient means 46 and allowing resilient means 44 and gravity to pivot directing element 32 clockwise until element 32 covers the outlet 26. Exhaust fluid is thereupon once again directed into the valve body and the cycle is complete.

The lost-motion connection 40 eliminates the need for a too-precise locating of body 8 in its lowered position. Thus, if body 8 comes to rest in a position somewhat lower than that shown in FIG. 3, link 52 also moves downward. However, instead of continuing to exert downward pressure on element 32, link 52 moves downward as pin 48 moves relatively upward in slot 50, avoiding damage to the directing element 32 or the connecting linkage which would occur in these circumstances if link 52 were provided with a round opening instead of a slot.

It will be apparent that this invention provides means for discharging the offensive engine exhaust to the atmosphere at points which are at all times far enough away from the operator's station to keep the exhaust from being a nuisance to the operator.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. A valve comprising a body having an inlet and two outlets, a directing element in the body and positionable to permit communication between the inlet and either of the outlets while shutting off communication between the inlet and the other outlet, resilient means biasing the directing element into position to communicate the inlet with one of the outlites and elastically deformable to permit movement of the directing element into position to communicate the inlet with the other outlet, and other resilient means biasing the directing element into position to communicate the inlet with said other outlet against the bias of the first-named resilient means and including an operating element movable in response to the application of an external force, said other resilient means being elastically deformable upon movement of the operating element by application of the external force as aforesaid to permit operation of the first-named resilient means to communicate the inlet with said one of the outlets.

2. A valve comprising a body having an inlet and two outlets, a directing element in the body and positionable to provide communication between the inlet and one of the outlets while shutting off communication between the inlet and the other outlet, resilient means biasing the directing element into position to communicate the inlet with one of the outlets and elastically deformable to permit movement of the directing element into position to communicate the inlet with the other oulet, other resilient means, and a lost-motion connection between said other resilient means and the directing element whereby said other resilient means biases the directing element into position to communicate the inlet with said other outlet against the bias of the first-named resilient means.

3. A valve as in claim 2, in which the lost-motion connection comprises a link pivotally connected with said other resilient means and connected with the directing element to move the directing element against the bias of the first-named resilient means, said link being ineffectual to move the directing element in the opposite direction.

4. A valve comprising a body having an inlet and two outlets, one of the outlets comprising a conduit projecting from the body, a directing element in the body and positionable to provide communication between the inlet and one of the outlets while shutting off communication between the inlet and the other outlet, resilient means biasing the directing element into position to communicate the inlet with one of the two outlets and elastically deformable to permit movement of the directing element into position to communicate the inlet with the other one of the two outlets, and other resilient means biasing the directing element into position to communicate the inlet with said other one of the two outlets against the bias of the first-named resilient means and including an operating element closely adjacent said conduit and movable in response to the application of an external force, said other resilient means being elastically deformable upon movement of the operating element py application of the external force as aforesaid to permit operation of the first-named resilient means to communicate the inlet with said one of the two outlets.

5. A valve comprising a body having an inlet and two outlets, a directing element in the body and positionable to provide communication between the inlet and one of the outlets while shutting off communication between the inlet and the other outlet, the directing element being normally in one position to communicate the inlet with one of the outlets and movable into a second position to communicate the inlet with the other outlet, resilient means, and lost-motion means connecting the resilient means and the directing element whereby the resilient means biases the directing element into said second position to communicate the inlet with said other outlet.

6. A valve as in claim 5, in which the lost-motion means comprises a link pivotally connected with the resilient means and connected with the directing element to move the directing element into said second position to communicate the inlet with the other outlet but ineffectual to move the directing element in the opposite direction.

7. A valve comprising a body having an inlet and two outlets, one of the outlets comprising a conduit projecting from the body, a directing element in the body and positionable to provide communication between the inlet and one of the outlets while shutting off communication between the inlet and the other outlet, the directing element being normally in one position to communicate the inlet with one of the two outlets and movable into a second position to communicate the inlet with the other one of the two outlets, and resilient means biasing the directing element into said second position to communicate the inlet with said other one of the two outlets and including an operating element closely adjacent said conduit and movable in response to the application of an external force, the resilient means being elastically deformable upon movement of the operating element by the application of external force as aforesaid to permit said normal positioning of the directing element to communicate the inlet with said one of the two outlets.

References Cited in the file of this patent

UNITED STATES PATENTS

| 1,218,367 | Bruggeman | Mar. 6, 1917 |

FOREIGN PATENTS

| 735,205 | Great Britain | Aug. 17, 1955 |
| 778,255 | Great Britain | July 3, 1957 |